(12) United States Patent
Ng et al.

(10) Patent No.: US 8,075,657 B2
(45) Date of Patent: Dec. 13, 2011

(54) IMPACTOR WITH DE-ICING

(75) Inventors: Kwok-Lam Ng, Madison, WI (US); Benjamin L. Scheckel, Stoughton, WI (US); Gerard Malgorn, Quimper (FR)

(73) Assignee: Cummins Filtration IP, Inc., Minneapolis, MN (US)

( * ) Notice: Subject to any disclaimer, the term of this patent is extended or adjusted under 35 U.S.C. 154(b) by 355 days.

(21) Appl. No.: 12/474,367

(22) Filed: May 29, 2009

(65) Prior Publication Data
US 2010/0300297 A1    Dec. 2, 2010

(51) Int. Cl.
*G01N 22/00* (2006.01)
(52) U.S. Cl. ........................ 55/465; 73/863.22; 73/28.05
(58) Field of Classification Search .................. 73/28.05, 73/863.22; 55/418, 462, 465
See application file for complete search history.

(56) References Cited

U.S. PATENT DOCUMENTS

| | | | |
|---|---|---|---|
| 3,739,147 A | 6/1973 | Mayhew et al. | |
| 3,799,125 A | 3/1974 | Hutchinson | |
| 3,962,874 A | 6/1976 | Doerner | |
| 5,024,203 A | 6/1991 | Hill | |
| 6,290,738 B1 | 9/2001 | Holm | |
| 6,595,368 B2 * | 7/2003 | Roberts et al. | 209/139.1 |
| 6,827,219 B2 | 12/2004 | Kim et al. | |
| 6,972,841 B2 * | 12/2005 | Krempl et al. | 356/338 |
| 7,238,216 B2 | 7/2007 | Malgorn et al. | |
| 7,473,291 B2 | 1/2009 | Evenstad et al. | |
| 2007/0256566 A1 | 11/2007 | Faber et al. | |

* cited by examiner

*Primary Examiner* — Robert A Hopkins
(74) *Attorney, Agent, or Firm* — Andrus, Sceales, Starke & Sawall, LLP

(57) ABSTRACT

An inertial gas-liquid impactor separator has a de-icer for preventing ice accumulation at the acceleration nozzles. A heater heats a nozzle plate to minimize plugging of acceleration nozzles otherwise due to icing.

6 Claims, 5 Drawing Sheets

IMPACTOR WITH DE-ICING

BACKGROUND AND SUMMARY

The invention relates to inertial gas-liquid impactor separators for removing liquid particles from a gas-liquid stream, including in engine crankcase ventilation separation applications, including closed crankcase ventilation (CCV) and open crankcase ventilation (OCV).

Inertial gas-liquid separators are known in the prior art. Liquid particles are removed from a gas-liquid stream by accelerating the stream or aerosol to high velocities through nozzles or orifices and directing same against an impactor, typically causing a sharp directional change, effecting the noted liquid separation. Such inertial impactors have various uses, including in oil separation applications for blowby gases from the crankcase of an internal combustion engine.

Under cold conditions, water vapor in the blowby gas can freeze, which in turn may cause restriction or plug the smallest cross-sectional area through the system. The acceleration nozzles may thus be susceptible to ice accumulation and freeze-up. It is known in the prior art to prevent icing by heating the incoming gas-liquid stream upstream of the nozzles, for example as shown in U.S. Pat. No. 5,024,203, FIG. 10, at electrical heater 21 in inlet 11.

The present invention arose during continuing development efforts in the above technology, and provides various improvements, including another solution to the noted icing problem.

BRIEF DESCRIPTION OF THE DRAWINGS

FIG. 1 is a sectional illustration of an inertial gas-liquid impactor separator.

FIG. 2 is like FIG. 1 and shows a further operational condition.

DETAILED DESCRIPTION

Figure 1:
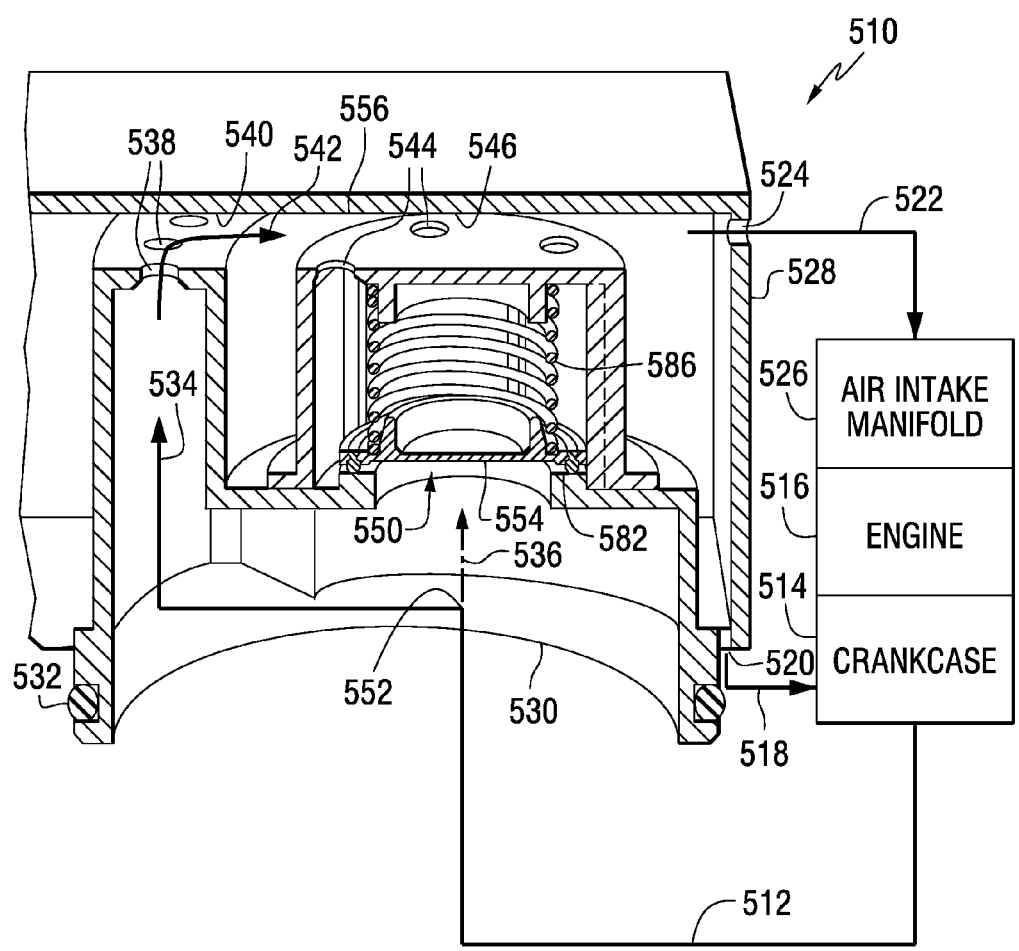
FIGS. 1 and 2 are taken from FIGS. 27 and 28, respectively, of commonly owned co-pending U.S. patent application Ser. No. 11/622,051, filed Jan. 11, 2007, incorporated herein by reference.

FIG. 1 shows an inertial gas-liquid separator 510 for removing liquid particles from a gas-liquid stream 512, for example oil particles from a blowby gas stream from crankcase 514 of internal combustion engine 516. In such embodiment, the separator returns separated oil 518 at drain 520 to crankcase 514, and returns separated air 522 at outlet 524 to air intake manifold 526 of the engine. In such application, it is desired to vent blowby gases from crankcase 514 of engine 516. Untreated, these gases contain particulate matter in the form of oil mist and soot. It is desirable to control the concentration of the contaminants, especially if the blowby gases are to be recirculated back to the engine's air intake system, for example at air intake manifold 526. The oil mist droplets are generally less than 5 μm in diameter, and hence are difficult to remove using conventional fibrous filter media while at the same time maintaining low flow resistance as the media collects and becomes saturated with oil and contaminants. The separator may be used in closed crankcase ventilation (CCV) systems and in open crankcase ventilation (OCV) systems, as well as other inertial gas-liquid impactor separator applications.

Separator 510 includes a housing 528 having an inlet 530 for receiving gas-liquid stream 512, and an outlet 524 for discharging a gas stream 522. The inlet may have a gasket such as O-ring 532 for sealed mounting to a component such as an engine crankcase. First and second flow branches 534 and 536 are provided through the housing from inlet 530 to outlet 524. First flow branch 534 has a set of one or more nozzles 538 receiving gas-liquid stream 512 from inlet 530 and accelerating the gas-liquid stream in the first flow branch in a downstream direction through the first set of one or more nozzles 538 against a first inertial impactor collector 540 in the housing in the path of the accelerated gas-liquid stream through first flow branch 534 and causing liquid particle separation. Inertial impactor collector 540 in the housing is in the path of the accelerated gas-liquid stream and causes liquid particle separation by a sharp directional change as shown at 542. In the preferred embodiment, impactor collector 540 has a rough porous collection or impingement surface causing liquid particle separation from the gas-liquid stream, and is like that shown in U.S. Pat. No. 6,290,738, incorporated herein by reference. In another embodiment, a smooth impervious impingement surface is used, providing a sharp cut-off size particle separation, as noted in the '738 patent. Nozzles 538 may be provided by orifices having a venturi or frustoconical shape as in the '738 patent. Second flow branch 536 has a second set of one or more nozzles 544 receiving the gas-liquid stream from inlet 530 and accelerating the gas-liquid stream in second flow branch 536 in a downstream direction through the second set of one or more nozzles 544 and against a second inertial impactor collector 546 in the housing in the path of the accelerated gas-liquid stream through second flow branch 536 and causing liquid particle separation by a sharp directional change as shown at 548, FIG. 2. A variable controller 550 in second branch 536 controls flow therethrough.

Figure 2:
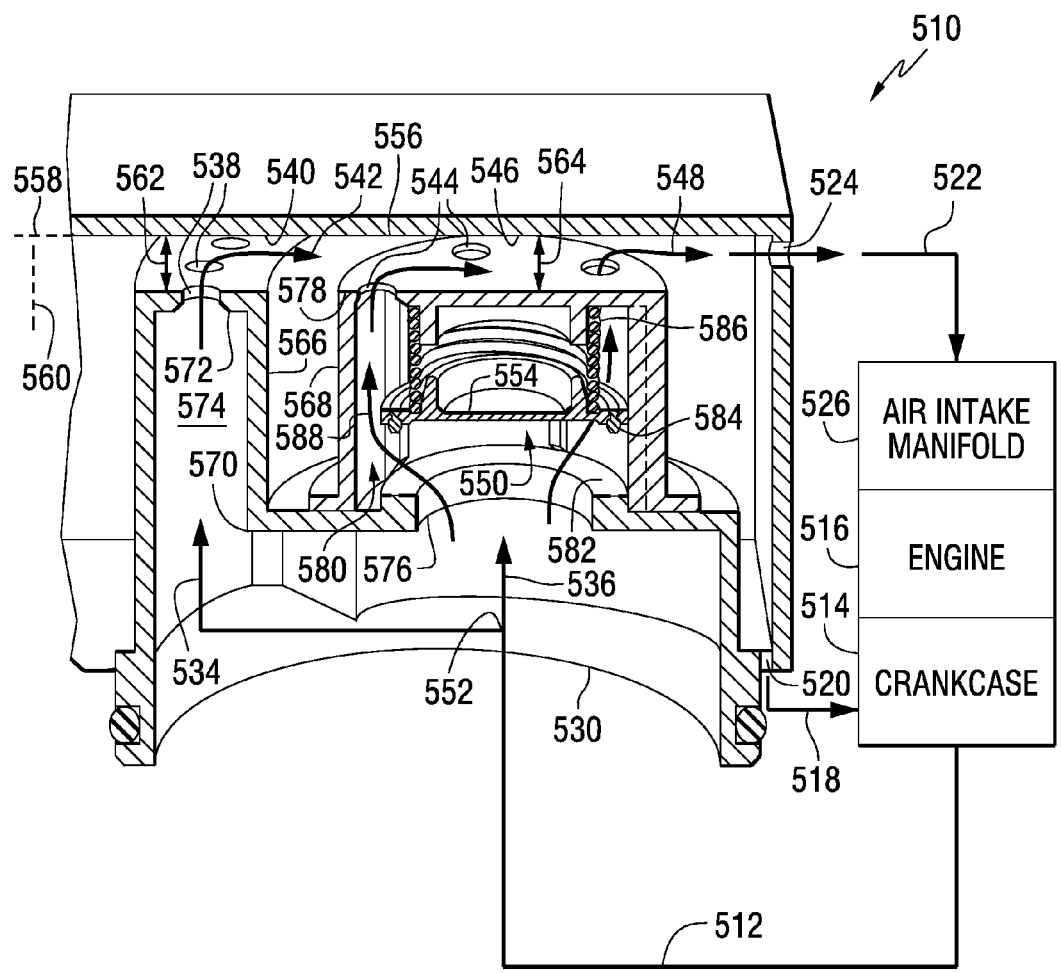

Variable controller 550, FIGS. 1, 2, in second flow branch 536 is responsive to pressure of gas-liquid stream 512. Variable controller 550 in second flow branch 536 is upstream of the noted second set of one or more nozzles 544. First and second flow branches 534 and 536 preferably diverge at a junction 552 downstream of inlet 530, and variable flow controller 550 is preferably downstream of such junction 552. First flow branch 534 is continuously open such that gas-liquid stream 512 can continuously flow therethrough and through the first set of one or more nozzles 538. Variable flow controller 550 includes a valve 554 actuatable to control flow through second flow branch 536 and the second set of one or more nozzles 544. Valve 554 is preferably a pressure relief valve responsive to increasing pressure of gas-liquid stream 512. Valve 554 may be actuatable between open and closed positions respectively passing and blocking flow through second flow branch 536 and the second set of one or more nozzles 544, which valve opens responsive to increasing pressure of gas-liquid stream 512. Flow branch 534 provides a first stage, and one or more flow branches such as 536 provide second, third and so on stages, one of which is shown at 536. Respective valves 554 may open at different pressures to provide a staggered sequentially opening multistage array providing staggered sequentially increasing flow area. In another embodiment, valve 554, rather than on/off, may provide a variable opening variably increasing the size of the opening to variably increase flow area through second branch 536 in response to increasing pressure of gas-liquid stream 512, including for example as in U.S. Pat. Nos. 7,238,216 and 7,473,291, both incorporated herein by reference. This multistage effect enables the above noted advantages including providing increased separation efficiency early in the life of the engine without suffering objectionably high pressure drop late in the life of the engine including end-of-life condition of the engine.

Gas-liquid stream 512 flows through the first and second sets of nozzles along parallel flow paths 534 and 536. The noted first and second inertial impactor collectors 540 and 546 share in one embodiment a common impaction plate 556 at impaction zones 540 and 546 laterally spaced along a lateral direction 558 normal to the direction of flow 560 along each of the noted parallel paths. The distance 562 between the first set of nozzles 538 and the first inertial impactor collector 540 is constant. Variable flow controller 550 is movable to control flow through second branch 536, and the distance 564 between the second set of one or more nozzles 544 and second inertial impactor collector 546 is constant, including during movement of variable flow controller 550. Distance 562 is preferably equal to distance 564.

First and second side-by-side chimneys 566 and 568 are provided in housing 528. Each chimney defines a respective axially extending flow path therethrough, as shown at 534 and 536. First chimney 566 has a first axial end 570 receiving gas-liquid stream 512 from housing inlet 530, and has a distally opposite second axial end 572 having the first set of one or more nozzles 538 therethrough. First chimney 566 has a first axial flow passage 574 therethrough between first and second axial ends 570 and 572, which axial flow passage 574 provides the noted first flow branch 534. Second chimney 568 has a first axial end 576 receiving gas-liquid stream 512 from housing inlet 530, and has a distally opposite second axial end 578 having the second set of one or more nozzles 544 therethrough. Second chimney 568 defines a second axial flow passage 580 therethrough between the first and second axial ends 576 and 578, which axial flow passage 580 provides the noted second flow branch 536.

Variable flow controller 550 is axially movable in second chimney 568, FIGS. 1, 2, along axial flow passage 580. Variable flow controller 550 preferably includes a valve member 554, which preferably includes a disc or the like, axially movable into and out of engagement with a valve seat 582 formed in second chimney 568, to respectively close and open second flow branch 536, as shown in FIGS. 1 and 2, respectively. Disc valve member 554 may include an annular gasket 584 for sealingly engaging valve seat 582. Valve seat 582 is at the noted first axial end 576 of second chimney 568. A biasing member such as helical compression spring 586 bears between the noted second axial end 578 of second chimney 568 and valve member disc 554 and biases valve member 554 to a normally closed position, FIG. 1, against valve seat 582. Valve member 554 is axially movable upwardly to an open position, FIG. 2, in response to pressure of gas-liquid stream 512 overcoming the bias of biasing member 586. Valve member 554 in the open position of FIG. 2 permits flow of the gas-liquid stream axially as shown at arrow 588 through second chimney 568 to the second set of one or more nozzles 544 at the noted second axial end 578 of chimney 568.

Figure 3:
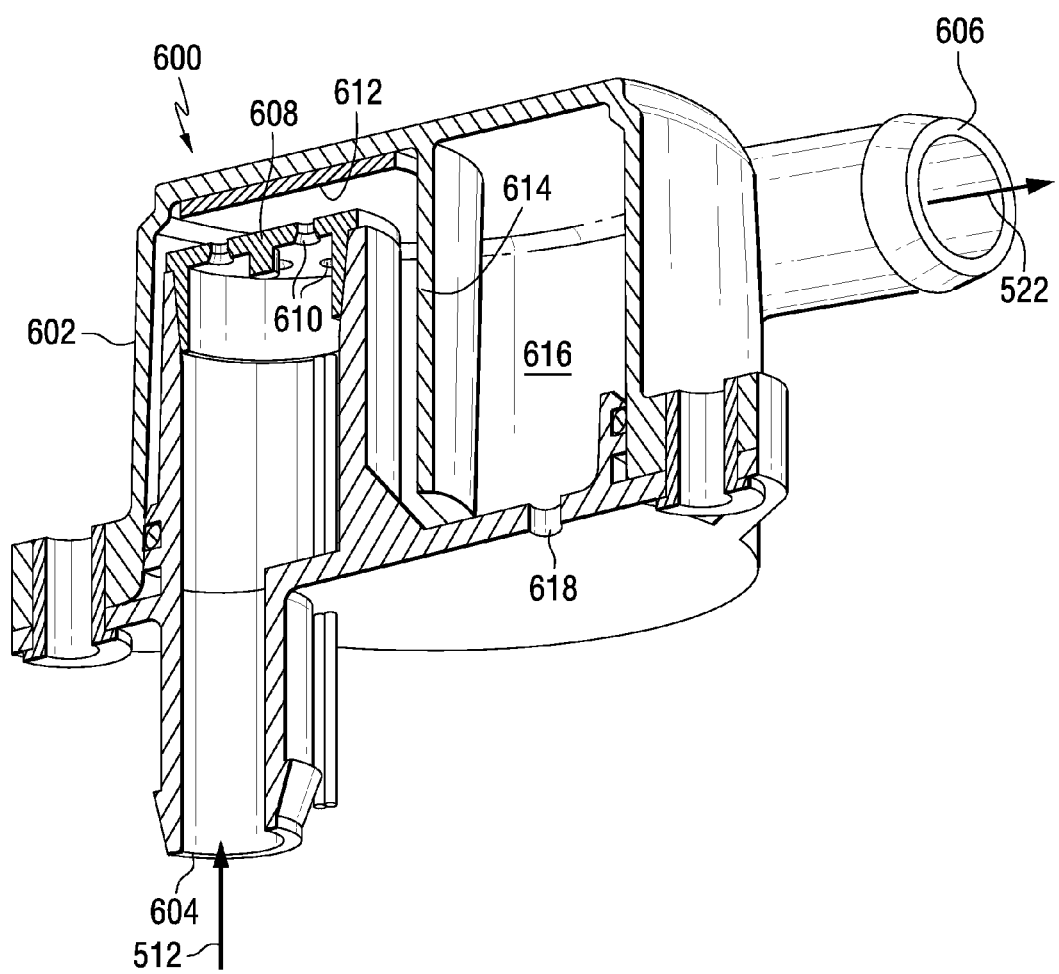
FIG. 3 is a sectional illustration of an inertial gas-liquid impactor separator in accordance with the invention.
Figure 4:
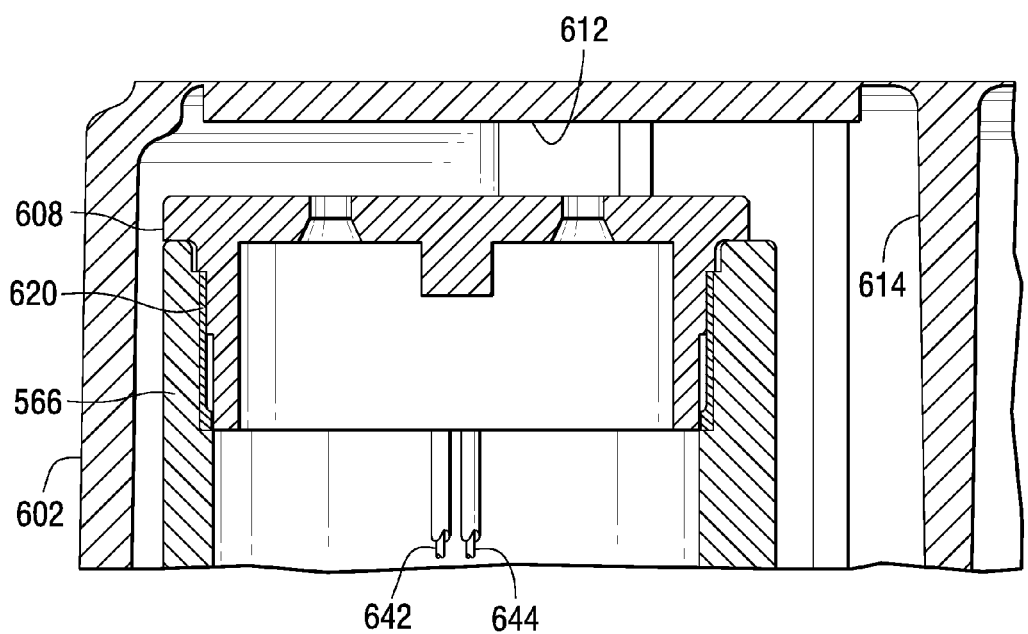
FIG. 4 is an enlarged view of a portion of FIG. 3.

FIG. 3 shows an inertial gas-liquid impactor separator 600 for removing liquid particles from a gas-liquid stream. The impactor includes a housing 602 having an inlet 604 for receiving gas-liquid stream 512, and an outlet 606 for discharging gas stream 522. Nozzle plate 608 in the housing has one or more nozzles 610 receiving gas-liquid stream 512 from inlet 604 and accelerating the gas-liquid stream through the nozzles. An inertial impactor collector 612 in the housing is in the path of the accelerated gas-liquid stream and causes liquid particle separation from the gas-liquid stream, as described above. The flow then travels downwardly along internal dividing wall 614 and then into collection well or plenum 616, from which the separated liquid may drain as shown at drain outlet 618, and from which the separated gas or air may flow upwardly and then exit at outlet 606 as shown at arrow 522. A heater 620, FIG. 4, in the housing heats nozzle plate 608 to minimize plugging of nozzles 610 otherwise due to icing. Heater 620 is downstream of inlet 604 and is thermally coupled to nozzle plate 608 such that the gas-liquid stream passes through inlet 604 unheated by heater 620, whereafter the gas-liquid stream 512 is heated by contact with nozzle plate 608. In one embodiment, the heater is an inductive heater, e.g. an annular or other shape band around and in contact with nozzle plate 608, inductively heating the nozzle plate. The band has an inner surface engaging nozzle plate 608, and an outer surface engaging and supported by chimney 566. In a further embodiment, the nozzle plate is an electrically resistive element heated by electric current therethrough, whereby the heater is an electrical resistance heater and is provided by the nozzle plate itself.

Figure 5:
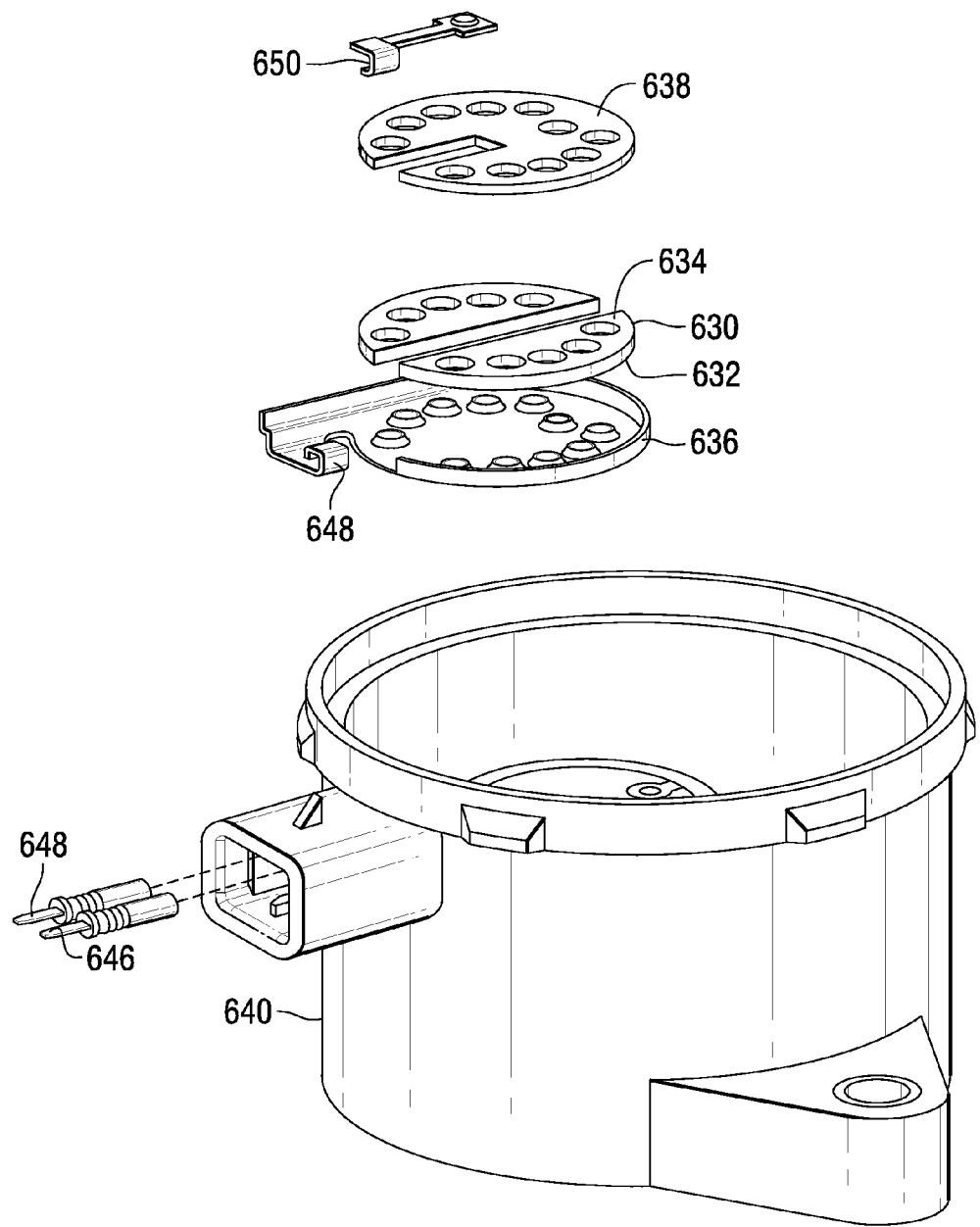
FIG. 5 is an exploded perspective view showing a further embodiment.

FIG. 5 shows another embodiment wherein nozzle plate 630 has a first upstream side 632 facing the unheated incoming flow of the gas-liquid stream from the inlet, and a second downstream side 634 facing distally oppositely from the upstream side. One or more thermally conductive diffuser discs 636, 638 are provided on one or both respective sides 632 and 634. The diffuser discs thermally conductively diffuse heat of the electrical resistance heater for rapid even heating of the nozzle plate. It is preferred that each side 632 and 634 of the nozzle plate 630 has its own respective diffuser disc 636 and 638 thermally conductively diffusing heat of the electrical resistance heater for rapid, even heating of the nozzle plate. Housing 602, FIGS. 3, 4, and housing 640, FIG. 5, have respective electrical conductor wires 642, 644, FIG. 4, 646, 648, FIG. 5, passing into the respective housing for supplying electric current to the respective heater, for example at respective electrical connections 648, 650. The wires are preferably sealed to the housing in gas-tight and liquid-tight relation. In one embodiment, the heater is preferably selected from the group consisting of an inductive heater, including a coil heater and a dielectric heater, a Peltier thermoelectric heater, and a passive heater, including a heat exchanger, for example such heat exchanger deriving heat from hot engine fluid from engine 516 in an internal combustion engine application. In further embodiments, the nozzle plate is a thermal conductor, e.g. aluminum, to efficiently and quickly distribute heat from an attached resistive heater. In further embodiments, as noted above, the nozzle plate is an electrically resistive element heated by electric current flow therethrough, whereby the heater is an electrical resistance heater and is provided by the nozzle plate itself. The electricity flows through the noted conductors to the resistive element which forms the acceleration nozzles, which element heats up when electricity flows through it. A metal plate, e.g. 636 and/or 638, on one or both sides of the resistive element diffuses the heat for quicker, more even performance.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An inertial gas-liquid impactor for removing liquid particles from a gas-liquid stream, comprising a housing having an inlet for receiving a gas-liquid stream, and an outlet for discharging a gas stream, a nozzle plate in said housing, said nozzle plate having at least one nozzle receiving said gas-liquid stream from said inlet and accelerating said gas-liquid stream through said nozzle, an inertial impactor collector in said housing in the path of said accelerated gas-liquid stream and causing liquid particle separation from gas-liquid stream, a heater in said housing heating said nozzle plate to minimize plugging of said nozzle otherwise due to icing, wherein said heater is downstream of said inlet and thermally coupled to said nozzle plate such that said gas-liquid stream passes through said inlet unheated by said heater, whereafter said gas-liquid stream is heated by contact with said nozzle plate, said nozzle plate comprises an electrically resistive element heated by electric current flow therethrough, whereby said heater is an electrical resistance heater and is provided by said nozzle plate itself.

2. The inertial gas-liquid impactor according to claim 1 wherein said nozzle plate has a first upstream side facing said unheated incoming flow of said gas-liquid stream from said inlet, and a second downstream side facing distally oppositely from said upstream side, and comprising a thermally conductive diffuser disc on one of said sides, said diffuser disc thermally conductively diffusing heat of said electrical resistance heater for rapid, even heating of said nozzle plate.

3. The inertial gas-liquid impactor according to claim 2 wherein said diffuser disc is a first diffuser disc, and comprising a second thermally conductive diffuser disc on the other of said sides and thermally conductively diffusing heat of said electrical resistance heater, whereby each of said sides of said nozzle plate has its own respective said diffuser disc thermally conductively diffusing heat of said electrical resistance heater for rapid, even heating of said nozzle plate.

4. An inertial gas-liquid impactor for removing liquid particles from a gas-liquid stream, comprising a housing having an inlet for receiving a gas-liquid stream, and an outlet for discharging a gas stream, a nozzle plate in said housing, said nozzle plate having at least one nozzle receiving said gas-liquid stream from said inlet and accelerating said gas-liquid stream through said nozzle, an inertial impactor collector in said housing in the path of said accelerated gas-liquid stream and causing liquid particle separation from gas-liquid stream, a heater in said housing heating said nozzle plate to minimize plugging of said nozzle otherwise due to icing, wherein said heater is downstream of said inlet and thermally coupled to said nozzle plate such that said gas-liquid stream passes through said inlet unheated by said heater, whereafter said gas-liquid stream is heated by contact with said nozzle plate, and comprising a pair of electrical conductor wires passing into said housing for supplying electric current to said heater.

5. The inertial gas-liquid impactor according to claim 4 wherein said wires are sealed to said housing in gas-tight and liquid-tight relation.

6. An inertial gas-liquid impactor for removing liquid particles from a gas-liquid stream, comprising a housing having an inlet for receiving a gas-liquid stream, and an outlet for discharging a gas stream, a nozzle late in said housing, said nozzle plate having at least one nozzle receiving said gas-liquid stream from said inlet and accelerating said gas-liquid stream through said nozzle, an inertial impactor collector in said housing in the path of said accelerated gas-liquid stream and causing liquid particle separation from gas-liquid stream, a heater in said housing heating said nozzle plate to minimize plugging of said nozzle otherwise due to icing, wherein said heater is downstream of said inlet and thermally coupled to said nozzle plate such that said gas-liquid stream passes through said inlet unheated by said heater, whereafter said gas-liquid stream is heated by contact with said nozzle plate, said heater is selected from the group consisting of an inductive heater, including a coil heater and a dielectric heater, a Peltier thermoelectric heater, and a passive heater, including a heat exchanger, said heat exchanger derives heat from hot engine fluid in an internal combustion engine application.

* * * * *